R. C. NEWHOUSE.
PROCESS OF PROJECTING MOVING PICTURES.
APPLICATION FILED APR. 15, 1912.
1,262,590.
Patented Apr. 9, 1918.
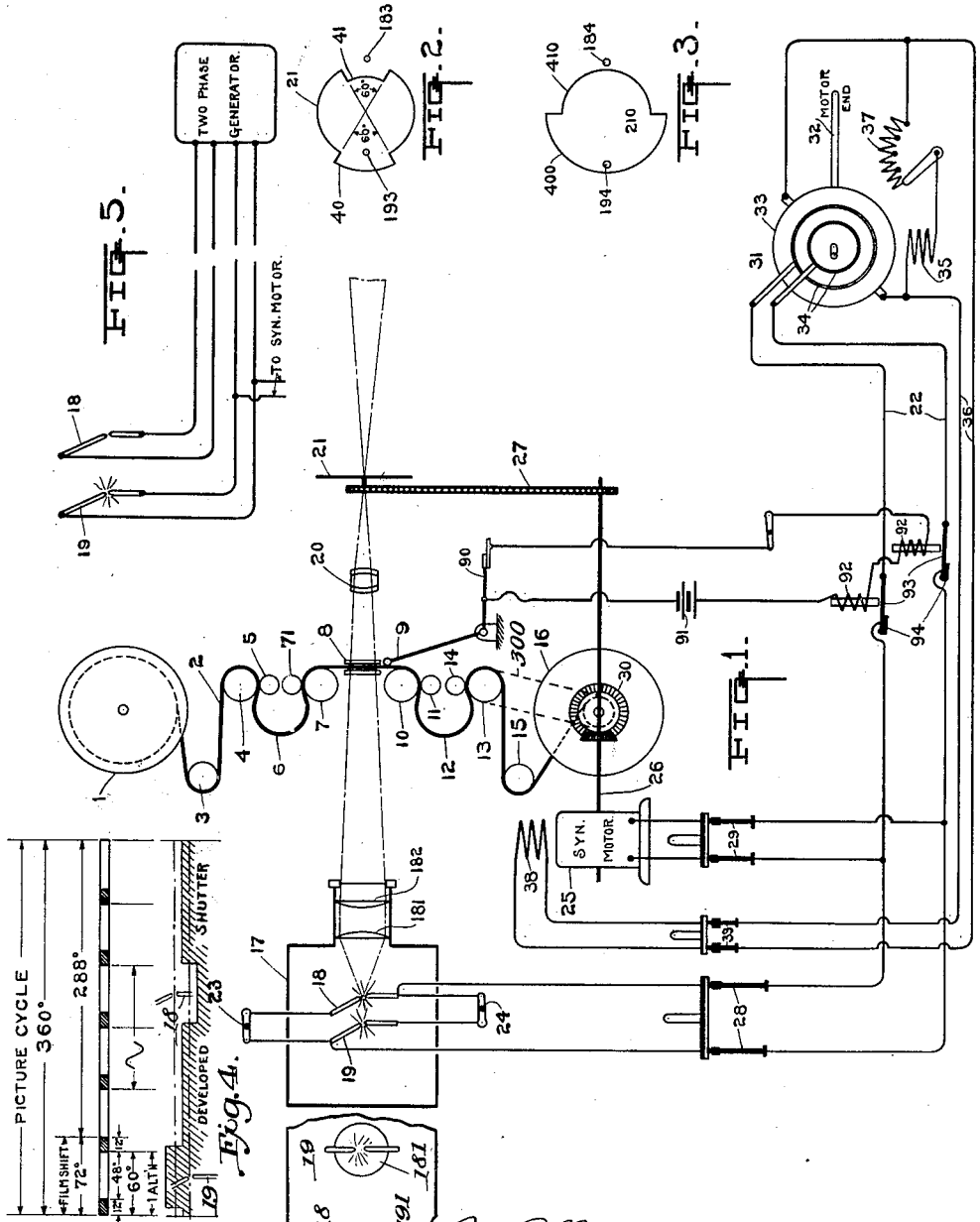

UNITED STATES PATENT OFFICE.

RAY C. NEWHOUSE, OF MILWAUKEE, WISCONSIN.

PROCESS OF PROJECTING MOVING PICTURES.

1,262,590.    Specification of Letters Patent.    Patented Apr. 9, 1918.

Application filed April 15, 1912. Serial No. 691,031.

*To all whom it may concern:*

Be it known that RAY C. NEWHOUSE, a citizen of the United States, residing at Milwaukee, in the county of Milwaukee and State of Wisconsin, has invented a certain new and useful Improvement in Processes of Projecting Moving Pictures, of which the following is a specification.

This invention relates to a process for projecting moving pictures; and the object of the invention is the projection of a moving picture on a screen with less flicker and with greater safety.

The flickering in the projection of moving pictures has been recognized as being caused by the alternation of intervals of darkness with intervals of light. The more intense the light the more noticeable becomes the flickering. It is now recognized, in the carrying out of this invention that a more important element enters into this consideration. It is the travel of shadow on the screen due to the interception of the rays of the projecting light by a moving object, either the shutter, or the film, or both. It has been recognized that the moving film becomes objectionable where a shutter is not used, only when the light is intense, so that comparatively faint lamp light could be used to project pictures and the film be moved without a shutter. But when a shutter becomes necessary on account of the intense light, the changes from intense light to darkness and the reverse cause flicker, and at the same time the movement of the shutter itself causes a shadow travel on the screen that is herein recognized as the principal cause of flickering.

Attempts have been made to reduce the time required during the cutting off of the light by the shutter by moving the same more quickly or by using a multiple shutter simultaneously movable from opposite directions, and such attempts have been rewarded with better pictures because each individual picture could be projected on the screen for a longer interval of time.

The shadow travel is entirely eliminated by this invention by the use of intermittent light, in which the light intervals are produced by originating and extinguishing the light, as distinguished from those produced by moving a shutter out of and into a beam of light of constant intensity. The film is moved to change the individual picture during the dark interval. The light intervals should be of sensible duration and the dark intervals relatively short and the alternations of light and dark intervals rapid to give the impression of continuous light.

Such an intermittent light can be produced in various ways, for instance, by using an arc lamp supplied by alternating current.

If the light used provides too short an interval of darkness for a picture change, a shutter may be used to cover one or more of the intervals of light, being moved respectively into and out of operative position during a dark interval of the intermittent light. This will produce a longer interval of darkness during which time the film may be moved or the individual pictures otherwise changed.

The present invention contemplates the production of the intermittent light with or without the longer intervals of darkness produced by a shutter as referred to, synchronously with the changing of the individual pictures. This can be done by operating the film moving mechanism by a synchronous electric motor supplied with current from the same source from which the arc lamp is supplied and in such a way as to move the film to change the individual pictures during a dark interval.

The present invention further contemplates the projection of light on the screen during the longer dark interval in the case where the shutter is used with the intermittent light, that is, during the same time the light is cut off by the shutter. This light takes the place of the light cut off by the shutter and is of such modified intensity as to correspond thereto in brilliancy in order to prevent the necessity of readjustment of the pupil of the eye of the observer of the picture on the screen. The substituted or complementary light must be of the same character as the original, that is, intermittently extinguished, in order, as before, to avoid shadow travel. This second light may be produced by an arc lamp supplied by the second phase of a two-phase alternating current, the first phase of which supplies the first lamp. In this case no shutter will be necessary because a low frequency would be used with dark intervals of long enough duration to shift the picture. It is preferable to have a second lamp in synchronism and in phase with the first, and this is most easily accomplished by having two arc lamps supplied from the same source of current. The shutter cuts one in while at the same time it cuts the other out, this taking place during a dark interval of the arc lights.

It is preferable to so arrange the shutter that the picture light interval is of the longest possible duration for each revolution of the shutter and the other light is projected on the screen only for a sufficient interval of time to change the picture.

A safety device may be provided by automatically opening the electric circuit supplying the lamps and the machine motor in case the film breaks.

For a better understanding of this invention reference is made to the accompanying drawing in which, Figure 1 is a diagrammatic side view of the projecting apparatus.

Fig. 2 is a front view of the shutter in relation to the two pencils of light.

Fig. 3 is a similar view of a modified form of shutter in a similar relation.

Fig. 4 is a schematic view of a picture cycle in relation to light variation and to a developed showing of the shutter shown in Fig. 2.

Fig. 5 is a diagrammatic view of the modification where a two-phase generator supplies the current.

Fig. 6 is a diagrammatic rear view of the lamp housing interior, the rear wall having been removed.

Referring to the drawings, a usual form of film moving mechanism is shown. Briefly this consists of a feed reel 1 feeding film 2 to an idler 3 and thence to the upper steady feed sprocket 4 having a pressure roller 5 holding the film in engagement therewith. The film then forms the upper feed loop 6 before it passes over the upper steady drum 7 with which it is held in engagement by the pressure roller 71. Thence it passes through the film-gate 8, past the novel safety switch bell crank lever 9 to the intermittent sprocket 10 having a pressure roller 11 holding the film in engagement therewith. The film then forms the lower feed loop 12 before it passes over the steady take-up sprocket 13 having a pressure roller 14 holding the film in engagement therewith. The film then passes over an idler 15 to the take-up reel 16.

As thus far described, except for the safety switch, the operation is as usual in this class of devices. The film is driven intermittently through the film-gate 8 and steadily to the upper loop 6 and from the lower loop 12.

The lamp housing 17 incloses the picture lamp 18 and the complementary lamp 19, both being here represented as arc lamps. These lamps are spaced apart in front view. The lamp housing 17 supports the condensing lenses 181, 182 for the picture lamp 18, there being a second set of condensing lenses, not shown, similarly supported for the complementary lamp 19, or these latter may be omitted if the light is of sufficient intensity. An objective lens 20 is located in front of the film-gate 8 and a shutter 21 is provided which, as shown, is in front of the lens 20. It may be at some other point depending on the relative order of arrangement of the lens 20, the film-gate 8 and the shutter 21, but ordinarily it is preferable to place it where the rays of light cross as shown in dotted lines.

This crossing of the rays is at a theoretical point but in practice it actually is a pencil of rays of light and this is the reason why in existing devices the shutter in action causes traveling shadows on the picture screen.

The prior art discloses shutters in order to cut off light from the screen during the interval of time the film is being advanced to present a succeeding positive print, and for this reason the mechanism for moving the film is positively geared to that for moving the shutter. It has been usual to move the film quickly (thus necessitating a narrow shutter), in order to be able to project the picture on the screen for a maximum interval of time. This condition causes a short dark interval followed by a comparatively long picture projecting interval, the two constituting a picture cycle.

It has also been usual to break up the long picture projecting interval by interrupting same by one or more, usually two, additional short dark intervals produced by the shutter in the same way. This was most easily done by using a three-wing disk shutter rotated once during a picture cycle.

In the development of this invention it is found that a shutter having a single wing of about one hundred eighty degrees rotated three times during a picture cycle will give a better picture even with the ordinary machine because of the decreased time interval consumed during the cutting in and out by the wings.

Such a shutter is shown in Fig. 3 and was the earliest form applied in combination with the apparatus now to be described.

An alternating current supply line 22 connects to the lamps 18, 19, in parallel through main switch 28 and individual lamp switches 23, 24. This alternating current is variable as to frequency and is therefore most easily provided by a generator 31 driven by a variable speed motor, not shown, of any convenient kind, connected to its shaft 32 at the motor end thereof as indicated in Fig. 1. This generator 31 is of a well known type having both a commutator 33 and collector rings 34. Direct current is supplied from the commutator 33 to excite the field 35 of the generator 31 and to supply the line 36.

Alternating current from the collector rings 34 is supplied to the supply line 22. The voltage of the generator is regulated by a suitable rheostat 37 inserted in its fields, as usual.

A synchronous motor 25 is supplied from the line 22 through main switch 29 and its shaft 26 is connected positively to the film moving mechanism by gears 30 and chain 300. This positive connection is shown only diagrammatically in Fig. 1 and is not to be understood to be a means for actuating only the take-up reel 16 but also, and more especially, the entire film moving mechanism. The shaft 26 is also positively connected to the shutter 21 by sprockets and chain 27. The field 38 of the synchronous motor 25 is supplied most conveniently with direct current from the generator 31 through the line 36 having therein a switch 39.

The shutter 21 is shown in Fig. 2 in its preferred form. The wing 40 at one side thereof extends beyond the periphery of the shutter and is directly opposite the recess 41 extending within the periphery of the shutter. Both the wing and the recess are of equal width circumferentially. This width is approximately sixty degrees where the period of movement of the film to change the picture is one-fifth, and the period of rest is four-fifths of the picture cycle, as is common practice in the art. The pencil 183 of rays of light from the lamp 18 is intercepted by the wing 40 and the pencil 193 of rays of light from the lamp 19 is in the path of the recess 41, the shutter axis being on the same level as the pencils of rays from the two lights.

The motor 25 is geared to the shutter 21 and to the film moving mechanism in such relation that the shutter 21 makes one revolution during the time of a picture cycle, see Fig. 4, and that there are three cycles or six alternations of the alternating current during the same period of time.

Ordinary alternating current will produce an intermittent light by an arc lamp supplied thereby in which the light intervals are approximately four times as long as the dark intervals, these latter being caused by interruptions of the arc during reversals of the current.

On account of there being six alternations per picture cycle, there will be sixty degrees of a picture cycle for each alternation of the current.

Referring to Fig. 4, six alternations of current corresponding to one picture cycle are diagrammatically shown by successive light and dark spaces. The dark spaces are of twelve degrees duration, as referred to the picture cycle, and the light, forty-eight degrees, making the relation between light and dark intervals, as stated.

One alternation, constituting a dark and a light interval, together with the succeeding dark interval, is seventy-two degrees of the picture cycle in duration. During this time the film is shifted to change the picture. The shutter 21 intercepts the light 18 during the interval of the alternation during which the film is shifted. This will be clear from an inspection of Fig. 4 which shows the developed shutter in the same relation to lights 18, 19, as in Fig. 2.

In the operation of this projecting device, current being available from the line 22, it is turned on to the arc lamps 18, 19, through the main switch 28 and individual switches 23, 24. The film moving mechanism is started by hand by the usual crank, not shown, and when at the proper speed, the synchronous motor 25 is electrically started by throwing in its switches 29, 39, the manual operation of the crank being then discontinued. The speed of the motor 25 is regulated by varying the speed of the generator 31. The positive prints on the film 2 will be projected as pictures on the screen. In the position of the shutter 21 as shown in Fig. 2 and referring to Fig. 4, the picture projecting interval of two hundred eighty-eight degrees is half consumed, while the second pencil 193 of rays from the complementary light 19 is in the middle of its eclipse.

During the film shift the light interval of forty-eight degrees from the picture light 18 is eclipsed by the wing 40 of the shutter 21, and this wing enters into eclipse position some time during the preceding dark interval of twelve degrees and leaves sometime during the succeeding dark interval of twelve degrees. The actual shifting of the film may consume the entire seventy-two degrees from the beginning of the preceding dark interval to the end of the succeeding dark interval.

The complementary light 19 being in phase with the picture light 18, will project its pencil 193 of rays upon the screen during every sixth of its light intervals and each of these forty-eight degree light intervals will be projected through the recess 41 at the time the picture light interval, occurring during the film shift, is in eclipse. The recess 41 enters into this operative position some time during the preceding dark interval of twelve degrees and leaves some time during the succeeding dark interval of twelve degrees. Each film positive will therefore be projected upon the screen five times, each of forty-eight degrees duration, alternating with intervals of darkness of twelve degrees duration. Before and after these projections there will also be a twelve degree interval of darkness and during the remaining forty-eight degrees of the cycle the complementary light 19 will illuminate the screen.

The earlier embodiment of shutter 210, shown in Fig. 3, has a single recess 410 of one hundred eighty degrees. The pencil 184 of rays from the picture light and the pencil 194 of rays from the complementary light are in line with the shutter axis and located so as to be eclipsed by the wing 400 during rotation of the shutter 210. The shutter is geared to run three times as fast as the preferred form of shutter 21.

In operation, this shutter 210 will eclipse the picture light three times during a picture cycle, during one of which the film is shifted. During these three times, the complementary light will be projected on the screen, the entire time being half the total. Alternating with these intervals are three others during which the picture is projected on the screen by the picture light half the entire time and the complementary light is in eclipse by the shutter. The leading and trailing edges of the wing 400 as before move into eclipse position and leave same sometime during the twelve degree intervals of darkness between light intervals. There is therefore no cutting into and out of the pencils of rays of light and consequently, no traveling shadow. Moreover, the screen is kept illuminated in average intensity, the complementary light being adjusted by hand in any known way, such as by varying the distance between the carbons, to compare equally with the varying average picture illumination due to light or dark positives on the film.

If the shutter 210 of Fig. 3 is used with the ordinary machine having only a single lamp, the higher speed will produce better pictures because of the shorter time consumed in cutting into and out of position by the wing.

Referring to Fig. 5, this shows the modification where a two-phase generator supplies current to the lamps so that when one is alight the other is dark.

The safety switch is shown in Fig. 1. This is to instantly shut off the current to lights and motor in case the film breaks, which always occurs just below the film-gate 8. The bell crank lever 9 rests against the film just below gate 8 where the film is taut when intact. This bell crank lever 9 serves as a switch 90 for a local circuit including a battery 91, hand switch and the coils 92, 92, of a double electro-magnetic switch 93 in the main supply line 22. The switch 93 in the main line has weighted ends 94, 94, and tends to swing open by gravity. The electro-magnets hold it closed when the local circuit is closed by the switch 90 of the bell crank lever 9 when in position against the film. Should the film break, the lever 9 will drop by gravity and open its switch 90 of the local circuit, and the deënergizing of the magnets will permit the switch 93 to open by gravity the main line 22 and thus put out the lights and stop the motor actuating the machine.

It is claimed and desired to secure by Letters Patent,—

1. In the process of projecting moving pictures, successively originating and extinguishing light by the use of an alternating current to produce effective intermittent light intervals of sensible duration, causing said intervals of light to project a series of positives on a screen, and moving said series of positives into position during intervening dark intervals.

2. In the process of projecting moving pictures, successively originating and extinguishing light to produce intermittent light intervals of sensible duration, periodically canceling at least one of said light intervals by beginning and ending said period of cancellation during dark intervals imposed upon the light, causing at least one of the remaining intervals of light to project one of a series of positives on a screen, and moving said series of positives during said period of cancellation.

3. In the process of projecting moving pictures, successively originating and extinguishing light to produce intermittent light intervals of sensible duration, periodically canceling at least one of said light intervals by beginning and ending said period of cancellation during dark intervals imposed upon the light, causing at least one of the remaining intervals of light to project one of a series of positives on a screen, moving said series of positives during said period of cancellation, and causing a similar interval of light to be projected on said screen in substitution of each of said canceled intervals.

4. In the process of producing moving pictures, successively originating and extinguishing light by the use of an alternating current to produce effective intermittent light intervals of sensible duration, causing said intervals of light to project a series of positives on a screen, moving said series of positives into position during intervening dark intervals, and causing similar intervals of light to be projected on said screen during said movement.

5. In the process of projecting moving pictures, successively moving a series of positives into position for projection, projecting light through said series of positives to a screen, periodically intercepting said light during said successive movements, and reducing the intensity of said light at the beginning and end of said period of interception.

6. In the process of producing moving pictures, successively moving a series of positives into position for projection, producing light of varying intensity by the use of alternating current, and projecting said light through said series of positives to a screen, each of said positives being moved into position for projection during the period of reduced intensity of said light.

7. In the process of producing moving pictures, successively moving a series of positives into position for projection, producing light of varying intensity by the use of alternating current, and projecting said light through said series of positives to a screen, each of said positives being moved out of position for projection during the period of reduced intensity of said light.

8. In the process of producing moving pictures, successively moving a series of positives into position for projection, producing light of varying intensity by the use of alternating current, and projecting said light through said series of positives to a screen, each of said positives being moved into and out of position for projection during the period of reduced intensity of said light.

9. In the process of producing moving pictures, producing light of varying intensity by the use of alternating current, by the application of said current moving into position for projection a series of positives in synchronism with said varying intensity of light, and projecting said light through said series of positives to a screen, each of said positives being moved during the period of reduced intensity of said light.

10. In the process of producing moving pictures, producing light of varying intensity by the use of alternating current, by the application of said current successively moving into position for projection a series of positives in synchronism with the varying intensity of said light, projecting said light through said series of positives to a screen, and periodically intercepting said light during said successive movements, the beginning and end of said period of interception occurring during the reduced intensity of said light.

In testimony whereof, the signature of the inventor is affixed hereto in the presence of two witnesses.

RAY C. NEWHOUSE.

Witnesses:
J. H. C. BAUMANN,
G. F. DE WEIN.